United States Patent
Andrews et al.

(10) Patent No.: US 8,009,777 B2
(45) Date of Patent: Aug. 30, 2011

(54) PROCESSING DATA IN A DIGITAL COMMUNICATIONS SYSTEM

(75) Inventors: Edward Andrews, St. Andrews (GB); Carlo Luschi, Oxford (GB); Jonathan Wallington, Portishead (GB)

(73) Assignee: Icera, Inc., Bristol (GB)

(*) Notice: Subject to any disclaimer, the term of this patent is extended or adjusted under 35 U.S.C. 154(b) by 761 days.

(21) Appl. No.: 11/812,116

(22) Filed: Jun. 15, 2007

(65) Prior Publication Data
US 2008/0310564 A1    Dec. 18, 2008

(51) Int. Cl.
*H03D 1/04* (2006.01)
(52) U.S. Cl. ........ 375/346; 375/348; 375/316; 375/285; 370/203; 370/342; 455/296
(58) Field of Classification Search .................. 375/348, 375/346, 316, 285; 370/203, 342; 455/296
See application file for complete search history.

(56) References Cited

U.S. PATENT DOCUMENTS

| | | | |
|---|---|---|---|
| 6,665,288 B1* | 12/2003 | Ottosson et al. | 370/342 |
| 7,406,065 B2* | 7/2008 | Willenegger et al. | 370/335 |
| 7,606,294 B2* | 10/2009 | Kokubo | 375/148 |
| 2002/0131390 A1* | 9/2002 | Kuo et al. | 370/342 |
| 2004/0017843 A1* | 1/2004 | Fitton et al. | 375/148 |
| 2004/0153679 A1* | 8/2004 | Fitton et al. | 713/322 |
| 2005/0094816 A1* | 5/2005 | Lindoff et al. | 380/268 |
| 2005/0099968 A1* | 5/2005 | Yamano | 370/311 |
| 2005/0152279 A1* | 7/2005 | Robertson et al. | 370/252 |
| 2006/0023653 A1* | 2/2006 | Montalbano | 370/315 |
| 2006/0135163 A1* | 6/2006 | Obuchi et al. | 455/436 |
| 2007/0072552 A1* | 3/2007 | Jonsson et al. | 455/67.11 |
| 2008/0130731 A1* | 6/2008 | Shiu et al. | 375/227 |
| 2008/0239936 A1* | 10/2008 | Doberstein | 370/201 |
| 2009/0296798 A1* | 12/2009 | Banna et al. | 375/229 |

FOREIGN PATENT DOCUMENTS

WO   03079577   9/2003

OTHER PUBLICATIONS

Kaltenberger, E., et al., Throughput Enhancement by Cancellation of Synchronization and Pilot Channel for UMTs High Speed Downlink Packet Access, IEEE, 2005 pp. 580-584.
International Search Report for related PCT Application No. PCT/EP2008/057435, 3 pp.
Written Opinion for related PCT Application No. PCT/EP2008/057435, 5 pp.

* cited by examiner

*Primary Examiner* — Kenneth Lam

(57) ABSTRACT

A method of processing a signal in a wireless digital communications system, wherein a source of disturbance affects differently at least first and second portions of a received signal carrying user data and/or control data, the method comprising: identifying the second portion of the received signal, most affected by the source of disturbance; generating a first estimate of the disturbance ($P_I$) for received samples in the first, less affected portion of the received signal; generating a second estimate of the disturbance ($P_{I(SCH)}$) for received samples in the second portion of the received signal; and using the first and second disturbance estimates to generate reliability information for the data bits corresponding to the received signal samples, for use in a decoding process to estimate the transmitted data bits.

29 Claims, 8 Drawing Sheets

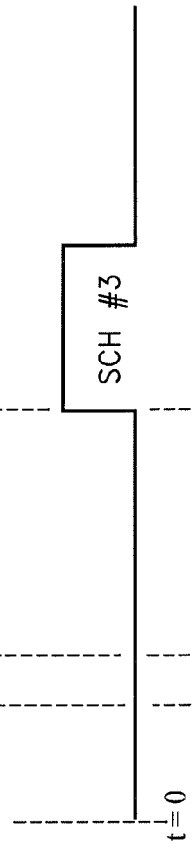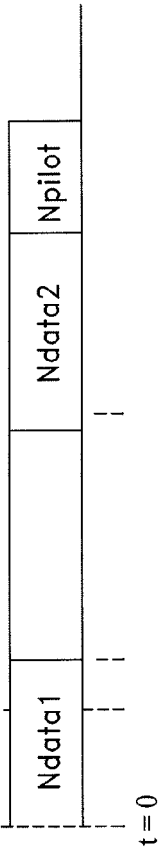

PROCESSING DATA IN A DIGITAL COMMUNICATIONS SYSTEM

FIELD OF THE INVENTION

This invention relates to processing in a wireless digital communication system and in particular where there is a source of non-stationary interference.

BACKGROUND OF THE INVENTION

In a 3GPP WCDMA (Wide Band Code-Division Multiple Access) digital communication system a Synchronisation Channel (SCH) is transmitted by base station equipment (Node B) of a cell for the first 256 chips of each 2560 chip time slot (3GPP TS 25.211, "Technical Specification Group Radio Access Network: Physical Channels and Mapping of Transport Channels onto Physical Channels (FDD)", June 2005, Section 5.3.3.5). The data transmitted on the SCH is essential for a User Equipment (UE) receiver in order to synchronise to the cell. As it is such an important channel, the SCH may be transmitted at a high power relative to other downlink channels transmitted in the cell. Unlike other WCDMA downlink channels, the SCH is not encoded using an Orthogonal Variable Spreading Factor (OVSF) code and therefore, even in the absence of multipath fading conditions, it is not orthogonal to other channels in the cell. When the user equipment is operating in high cell geometry (i.e. it is close to the centre of the cell), the SCH may be a significant source of interference. This may be problematic for two reasons. Firstly, the SCH signal may affect the received signals of other lower power downlink channels, causing errors of phase and amplitude in the corresponding data samples. Secondly, interference estimates made on specific chip positions within the slot may not correctly take the SCH interference into account. For downlink Dedicated Physical Channels (DPCHs), the interference experienced during a slot is typically estimated based on the DPCH dedicated pilot symbols transmitted at the end of the slot, or based on the Common Pilot Channel (CPICH) transmitted over the entire slot. When the interference is estimated from the dedicated pilots, depending on the relative delay between the DPCH and SCH, the SCH may affect the DPCH data fields but not the pilot field. When the interference is estimated from the CPICH, the SCH only affects a single CPICH symbol of the CPICH slot. Therefore, neither method can correctly take into account the SCH interference on the affected data samples. As a result, the DPCH symbols affected by the SCH will have a much higher actual level of interference than that estimated.

FIG. 1 is a schematic block diagram of the receiver for a digital communications system. An antenna 2 receives an incoming signal 4 over a wireless communication channel. The incoming signal 4 is supplied to RF and IF stages 6 which provide a baseband signal to a receiver front end 8 where analogue to digital conversion takes place.

The receiver front end 8 supplies digitised data to a signal detector 10 which generates received signal samples $y_k$ for further processing in the receiver. In a wide band code-division multiple access user equipment, the signal detector 10 can take the form of a rake receiver or a chip level equaliser with suitable descrambling and despreading components. These generate DPCH signal samples $y_k$ in a known manner.

One of the functions of the receiver is to calculate reliability information on the received data bits, for example in the form of bit log likelihood ratios (LLRs). An LLR calculation block is denoted by reference numeral 12 in FIG. 1. The log likelihood ratios are supplied to a deinterlever and channel decoder 14 for decoding the received data bits associated with the signal samples $y_k$. Channel decoders which take into account reliability information for example in the form of log likelihood ratios are often referred to as soft-input channel decoders. Examples are given by soft-input/hard-output convolutional decoders or soft-input/soft-output turbo decoders.

It can be seen that in situations where the SCH interference (which can be significant on the affected data samples) is not properly taken into account, not only the data bits corresponding to these signal samples will be subject to higher interference, but their reliability estimates will indicate a much higher level of reliability than is in fact the case.

The DPCH samples $y_k$ are modelled as the sum of a signal component and an interference-plus-noise component $$y_k = a\sqrt{E_s}s_k + n_k, \quad \text{Equation 1}$$

where $s_k = s_{Ik} + js_{Qk}$, $s_{Ik} = b_{1k}$, $s_{Qk} = b_{2k} \in \{+1,-1\}$ are the QPSK symbols transmitted on the DPCH, $b_{1k}$, $b_{2k}$ denote the bits mapped onto each symbol, $a \in R^+$ wherein $R^+$ is the set of positive real numbers, $E_s$ is the received symbol energy, and $n_k = n_{Ik} + jn_{Qk}$ represents the noise-plus-interference, modelled as an additive complex Gaussian process with zero mean and variance $N_0$. The bit LLRs relative to the received signal $r_k$ can be derived independently for each of the two bits $b_{1k}$, $b_{2k}$ mapped to the QPSK symbol $s_k$. Considering the bit $b_{ik}$, $i=1, 2$ and letting $y_{ik} = \text{Re}[y_k]$ for $i=1$ and $y_{ik} = \text{Im}[y_k]$ for $i=2$, we have $$L(b_{ik} \mid y_k) = \ln\frac{Pr(b_{ik} = +1 \mid y_k)}{Pr(b_{ik} = -1 \mid y_k)} = \frac{4ay_{ik}\sqrt{E_s}}{N_0}. \quad \text{Equation 2}$$

FIG. 2 is a schematic block diagram of the LLR calculation block 12. As shown in FIG. 2, the LLR for the DPCH bits is calculated using an estimate of the received signal energy $E_s$ and of the noise-plus-interference variance $N_0$ (block 16). Specifically, apart from a suitable scaling factor $\eta$, the LLR is obtained as the product of the demodulated signal amplitude $y_{ik}$ and an estimate of the quantity $\sqrt{E_s}/N_0$ in the LLR scaling block 18

$$L(b_{ik} \mid y_k) = y_{ik} \times \eta\frac{\sqrt{E_s}}{N_0}. \quad \text{Equation 3}$$

As illustrated in FIG. 2, the estimate of the quantities $E_s$ and $N_0$ is obtained from the dedicated DPCH pilots corresponding to the samples $y_k$ at specified positions within the DPCH time slot (normally at the end). Since the DPCH time slot is transmitted with a specified delay $\tau_{DPCH}$ with respect to the SCH time slot, the DPCH dedicated pilot symbols may not be affected by the SCH. If this happens, and if the SCH represents a significant portion of the total received power, then the received DPCH symbols corresponding to the position of the SCH may have a very large amplitude due to SCH interference, and at the same time the estimate of the noise-plus-interference power $N_0$ may be small, because it does not take into account the SCH interference. In this situation, the reliability of the received data will be overestimated, potentially by a significant amount. Large, erroneous LLRs will have a negative impact on the channel decoder's ability to correct errors.

An alternative possibility is to base the estimate of $N_0$ on samples $y_{k(CPICH)}$ of CPICH symbols distributed throughout the slot. In this case, $E_s$ can be estimated using the DPCH pilot samples. If the estimate of $N_0$ is based on the CPICH symbols, and is obtained from the entire CPICH time slot, again for the received DPCH symbols corresponding to the position of the SCH the noise-plus-interference power will be underestimated, and the reliability of the received data will be overestimated.

The fact that the presence of the SCH channel may limit the performance of the WCDMA downlink has been already discussed in an article by F. Kaltenberger, K. Freudenthaler, S. Paul, J. Wehinger, C. F. Mecklenbräuker and S. Springer, "Throughput enhancement by cancellation of synchronisation and pilot channel for UMTD High Speed Downlink Packet Access", Proceedings of $6^{th}$ IEEE International Workshop on Advances in Wireless Communications (SPAWC), New York, USA, June 2005, pp. 603-607. This article proposes to resolve the problem by cancelling the interference due to the SCH. This approach has the disadvantage of a high implementation cost due to the complexity of the required circuitry in the receiver.

SUMMARY OF THE INVENTION

According to an aspect of the present invention there is provided a method of processing a signal in a wireless digital communications system, wherein a source of disturbance affects differently at least first and second portions of a received signal carrying user data and/or control data, the method comprising: identifying the second portion of the received signal most affected by the source of disturbance; generating a first estimate of the disturbance ($P_I$) for received samples in the first, less affected portion of the received signal; generating a second estimate of the disturbance ($P_{I(SCH)}$) for received samples in the second portion of the received signal; and using the first and second disturbance estimates to generate reliability information for data bits corresponding to the received signal samples, for use in a decoding process to estimate the transmitted data bits.

Another aspect of the invention provides a receiver for processing a signal in a wireless digital communications system, wherein a source of disturbance affects differently at least first and second portions of a received signal carrying user data and/or control data, the receiver comprising: a component adapted to identify the second portion of the received signal, most affected by the source of disturbance; a first estimator adapted to generate a first disturbance estimate ($P_I$) for received samples in the first, less affected portion of the received signal; a second estimator adapted to generate a second disturbance estimate ($P_{I(SCH)}$) for received samples in the second, most affected portion of the received signal; and a reliability information generator adapted to use the first and second disturbance estimates to generate reliability information for data bits corresponding to the received signal samples, for use in a decoder to estimate the transmitted data bits.

A further aspect provides a digital communications system comprising: an antenna for receiving a wireless signal; a receiver front-end for receiving the wireless signal in analogue form and providing digital samples therefrom; a baseband receiver for processing the signal samples, said baseband receiver comprising: a component adapted to identify a second portion of the received signal, most affected by a source of disturbance; a first estimator adapted to generate a first disturbance estimate for received samples in a first, less affected portion of the received signal; a second estimator adapted to generate a second disturbance estimate for received samples in the second portion of the received signal; a reliability information generator adapted to use the first and second disturbance estimates to generate reliability information for data bits corresponding to the received signal samples; and a decoder for receiving the reliability information and arranged to estimate the transmitted data bits.

A further aspect provides an integrated circuit incorporating a receiver for processing a signal in a wireless digital communications system, wherein a source of disturbance affects differently first and second portions of a received signal carrying user data and/or control data, the receiver comprising: a component adapted to identify the second portion of the received signal most affected by the source of disturbance; a first estimator adapted to generate a first disturbance estimate for received samples in the first, less affected portion of the received signal; a second estimator adapted to generate a second disturbance estimate for received samples in the second portion of the received signal; and a reliability information generator adapted to use the first and second disturbance estimates to generate reliability information for data bits corresponding to the received signal samples, for use in a decoder to estimate the transmitted data bits.

A further aspect provides a mobile terminal incorporating a receiver for processing a signal in a wireless digital communications system as defined in the foregoing.

A further aspect provides a computer program product comprising computer code means which when installed in a computer implements the following steps in a method of processing a signal in a wireless digital communications system, the method steps comprising: identifying a second portion of the received signal most affected by the source of disturbance; generating a first estimate of disturbance for received samples in a first less affected portion of the received signal; generating a second estimate of the disturbance for received samples in the second portion of the received signal; and using the first and second disturbance estimates to generate reliability information for data bits corresponding to the received signal samples, for use in a decoding process to estimate the transmitted data bits.

It will be appreciated that the word "disturbance" used herein refers to any part of the signal which is not information. That is, the disturbance could be due to noise or interference or a combination of the two.

The following described embodiments of the invention address the problem of computing the reliability information of data affected by interference that is present only over a limited time interval. The example which is discussed in the described embodiments is the case of a 3GPP WCDMA system, where the interference associated with downlink synchronisation SCH channels only affects a fraction of the data transmitted in a time slot, referred to as an affected portion. The remainder of the data is referred to as the unaffected portion. The method described herein makes use of, in one embodiment, a modified algorithm for the estimation of the total interference-plus-noise power, which relies on the identification of time intervals over which the interference can be modelled as a stationary noise process.

Although the specific example which is discussed in the following relates to this context, the invention is more broadly applicable. For example, techniques described herein can be used in other situations where "non-stationary" interference is present in a wireless digital communications system. Non-stationary interference is interference whose statistics (e.g. power) are not constant in time. However, there are situations where a non-stationary interference process can be modelled as practically stationary over a given time interval—with different statistics over different time intervals. For example, the techniques described herein could be used in a CDMA system where some of the channels (that are not synchronous with the channel containing the dedicated/common pilots) are not always transmitted and/or are transmitted with different power levels over different transmission intervals.

The following described embodiments of the invention provide a significant advantage with respect to the prior art discussed above, avoiding the need to cancel the interference due to the synchronisation channels. Instead, this interference is taken into account to properly compute the bit reliability for the affected data symbols. In addition to reducing the implementation cost, the solution of the present invention is computationally more robust.

For a better understanding of the present invention and to show how the same may be carried into effect, reference will now be made by way of example to FIGS. 3 to 7 of the accompanying drawings.

BRIEF DESCRIPTION OF THE DRAWINGS

FIGS. 8A-8D illustrate four different sets of symbols affected in different ways by three SCH signals.

DESCRIPTION OF THE PREFERRED EMBODIMENTS

Figure 3:
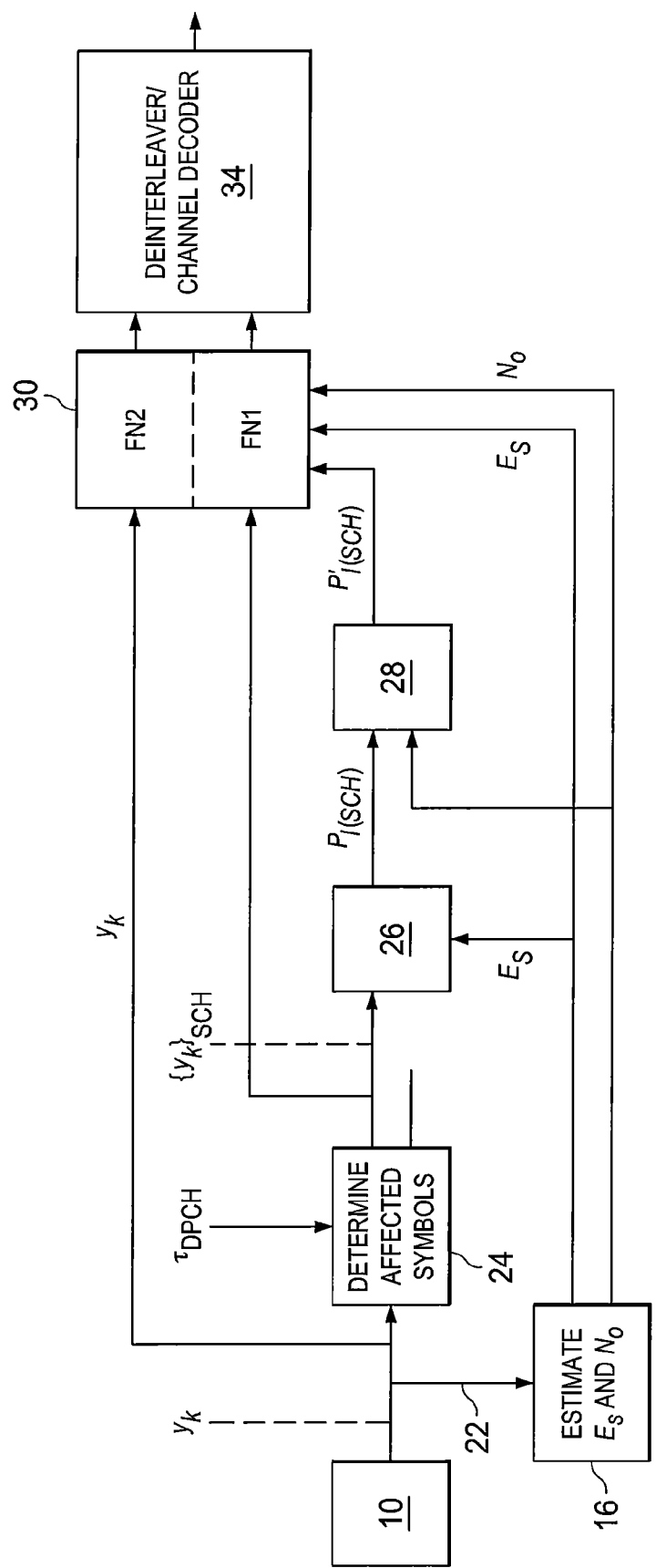
FIG. 3 is a schematic block diagram of one embodiment of the invention.

FIG. 3 is a schematic block diagram of a first embodiment of the present invention arranged to address the problem of degraded channel decoding performance in the presence of high SCH interference in a 3GPP WCDMA digital communications system. Before discussing operation of FIG. 3, reference will first be made to FIG. 4 which schematically illustrates the relationship between SCH and DPCH channels in a WCDMA digital communications system.

Figure 4:
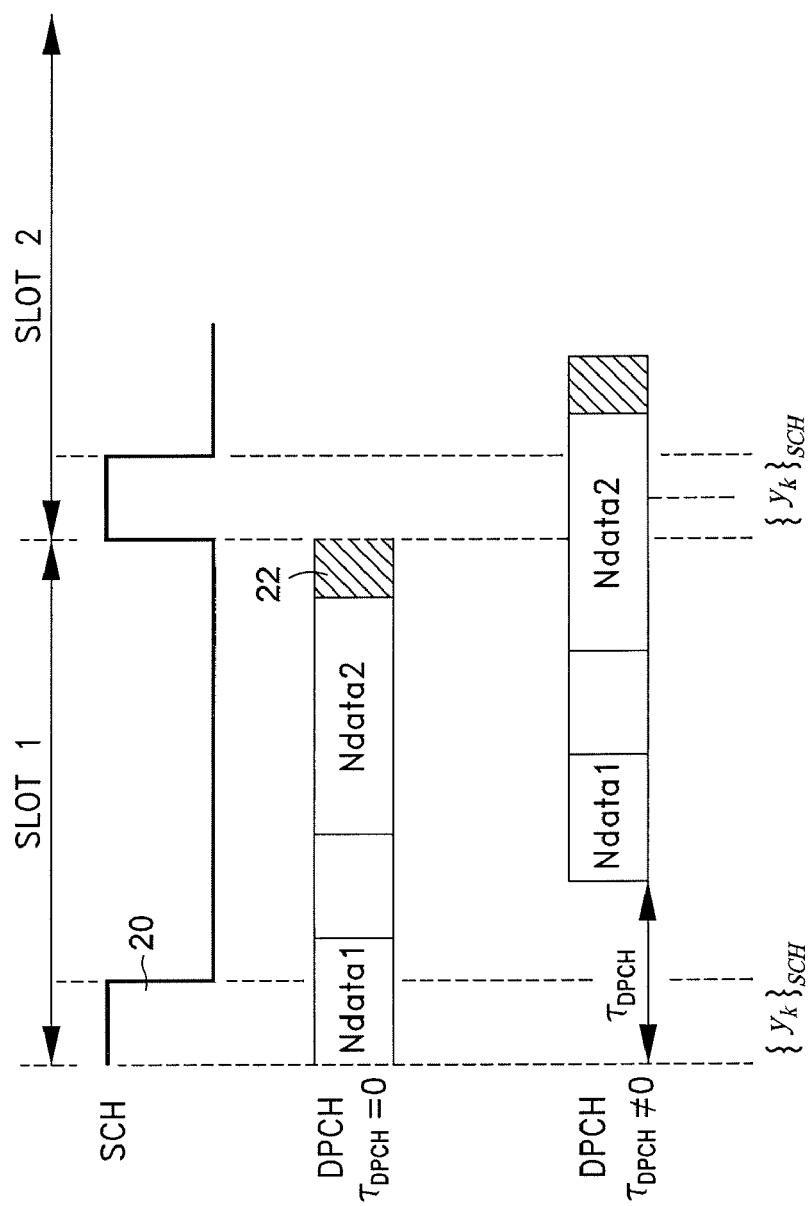
FIG. 4 is a schematic diagram illustrating a channel affected by interference from a synchronisation channel.

FIG. 4 shows a transmission slot in a WCDMA digital communications system. In the described embodiment, the slot contains 2560 chips. There are 15 slots per 10 ms transmission frame. On the SCH channel, transmission takes place only for the first 256 chips of each slot, which carry the synchronisation signal referenced 20 in FIG. 4.

As is know in the art, the DPCH slot can carry user data from one or more transport channels in two different data fields, Ndata1 and Ndata2. The time slot in the DPCH channel also carries pilot symbols 22 at the end of the slot. The portion of the DPCH slot in FIG. 4 carrying user data is referred to as Dedicated Physical Data Channel (DPDCH). The present invention also applies to the portion of the DPCH slot in FIG. 4 carrying control data, referred to as Dedicated Physical Control Channel (DPCCH), including power control command (TPC) symbols. It can be seen from FIG. 4 that the DPCH symbols affected by the SCH depend on the delay $\tau_{DPCH}$ which is defined as the DPCH timing offset with respect to the P-CCPCH frame. The delay $\tau_{DPCH}$ effectively coincides with the timing offset with respect to the SCH frame, and so allows the location of symbols affected by the SCH signal to be determined. The slot format of the DPCH is defined in 3GPP TS 25.211, "Technical Specification Group Radio Access Network; Physical Channels and Mapping of Transport Channels onto Physically Channels (FDD)", June 2005, Section 5.3.2.

As shown in FIG. 4, depending on the value of the timing offset $\tau_{DPCH}$, the bits affected by SCH interference may be in the DPDCH fields Ndata1 or Ndata2. Although not shown in FIG. 4, the SCH interference may also affect the DPCCH fields. In the example of FIG. 4, in neither case are the pilot symbols affected. It is noted that in the event that only the dedicated pilot symbols are affected by SCH interference, there is no need to use the techniques described herein. In fact, in that case, the disturbance estimated on the pilot symbols will be higher than that experienced by the rest of the slot, resulting in LLRs which are uniformly depressed from their true value (that is, the one they would have if disturbance estimation were perfect) The uniformity of this change means that the decoder performance is not severely affected and so no special action will be required.

Figure 1:
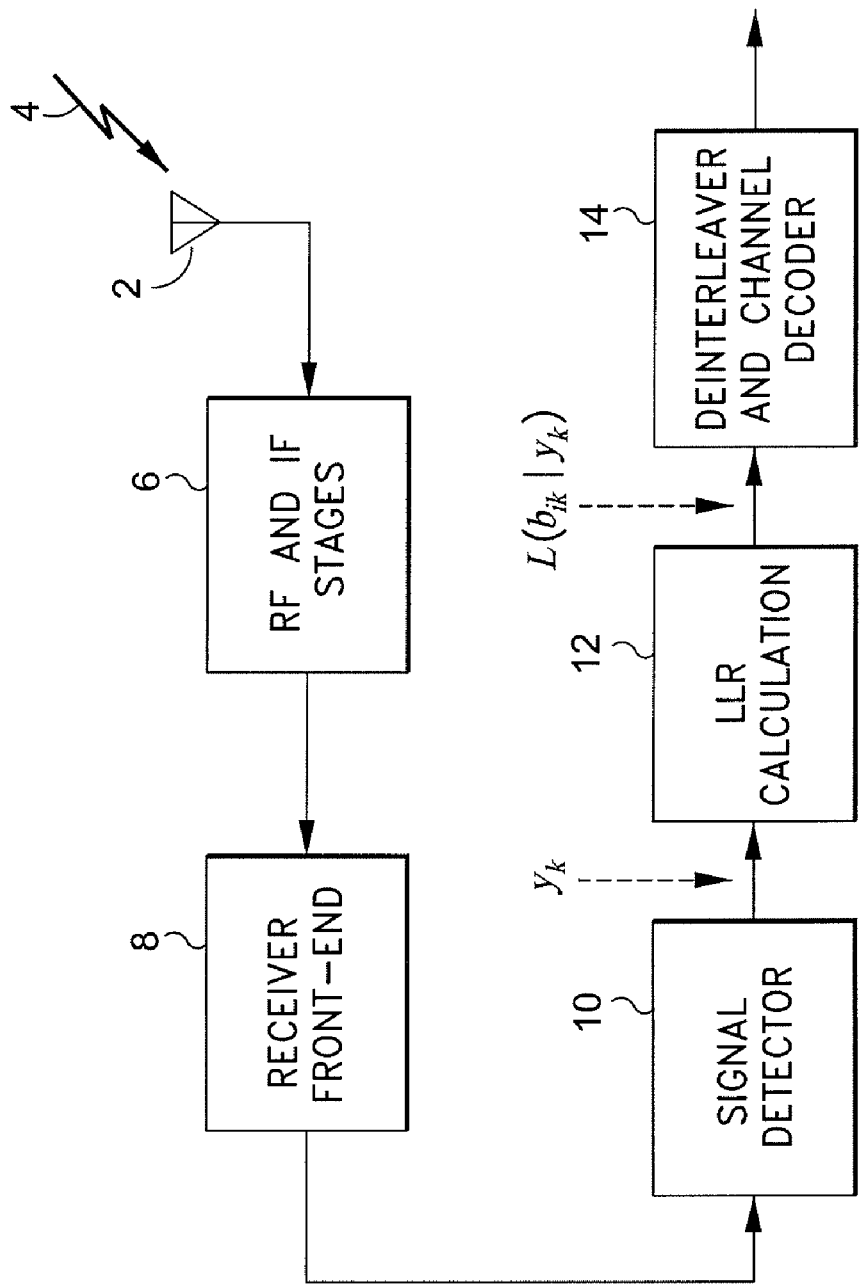
FIG. 1 is a schematic block diagram of data flow in a receiver.

Reference will now be made to FIG. 3 to describe one embodiment of the invention. FIG. 3 illustrates in schematic block diagram form circuitry at a receiver in a wireless digital communication system. The signal detector 10 takes the same form as that shown in FIG. 1. This is known in the art and so will not be described further. As is also known, a block 16 which estimates received signal energy $E_s$ and noise-plus-interference variance $N_0$ is arranged to receive dedicated DPCH pilot samples 22 from the incoming samples $y_k$.

An affected sample determination block 24 determines symbols which are affected by the SCH signal 20 using the delay $\tau_{DPCH}$. The set of affected samples is denoted $\{y_k\}_{SCH}$. The affected samples are supplied to a power estimation block 26. The power estimation block 26 estimates the average total received power $P_T$ from the set of samples $\{y_k\}_{SCH}$ corresponding to the $N_{SCH}$ DPCH symbols affected by the SCH signal 20:

$$P_T = \frac{1}{N_{SCH}} \sum_k |y_k|^2 \qquad \text{Equation 4}$$

Using a signal power estimate $P_S$ derived from the DPCH dedicated pilot symbols (from the symbol energy estimate $E_s$), the power estimation block determines the interference power $P_{I(SCH)}$ on the received symbols affected by the SCH according to $$P_{I(SCH)} = P_T - P_S. \qquad \text{Equation 5}$$

A maximum power value $P'_{I(SCH)}$ is computed in block 28 as the maximum between $P_{I(SCH)}$ and the interference power $P_I$ for the received symbols not affected by the SCH (originally calculated as $N_0$ by using the DPCH dedicated pilot symbols):

$$P'_{I(SCH)} = \max(P_{I(SCH)}, P_I) \qquad \text{Equation 6}$$

For the QPSK modulated DPCH, LLR values $L(b_{ik}|y_k)$ are then calculated by a first LLR scaling function FN1 in scaling block 30 using $N_0 = P'_{I(SCH)}$ for the symbols affected by the SCH:

$$L(b_{ik} \mid y_k) = y_{ik} \times \eta \frac{\sqrt{E_s}}{P'_{I(SCH)}} \quad \text{Equation 7}$$

A second LLR scaling function FN2 in block 30 calculates LLR values using $N_0 = P_I$ for the symbols not affected by the SCH:

$$L(b_{ik} \mid y_k) = y_{ik} \times \eta \frac{\sqrt{E_s}}{P_I} \quad \text{Equation 8}$$

The LLRs are then processed by deinterleaving, depuncturing and soft-input channel decoding (block 34), which uses the reliability information on the coded bits to derive an estimate of the transmitted uncoded bits in a manner which is known in the art and so will not be discussed further herein.

Figure 2:
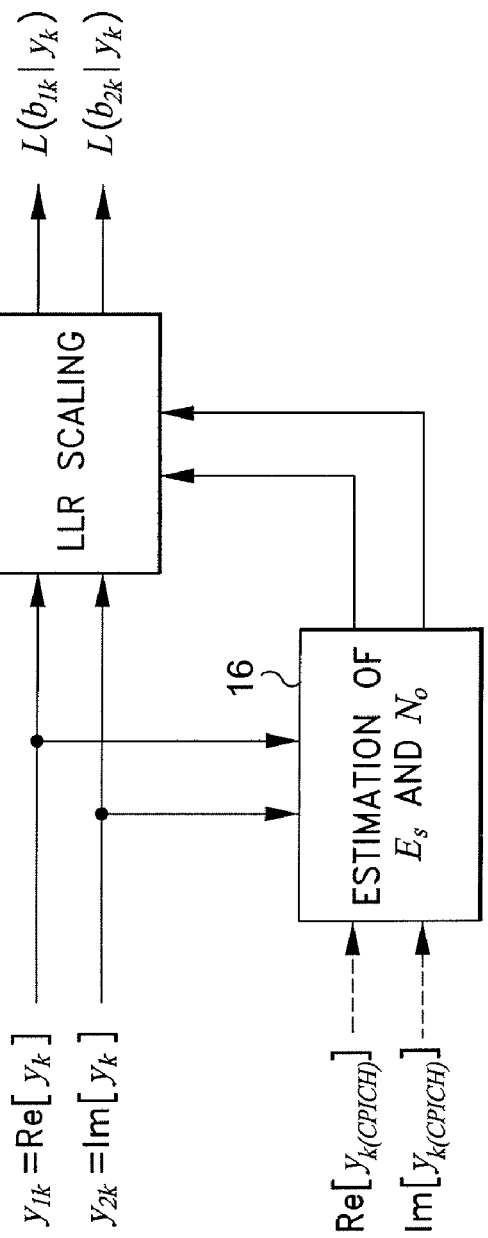
FIG. 2 is a schematic block diagram of calculation of reliability information for channel decoding.
Figure 5:
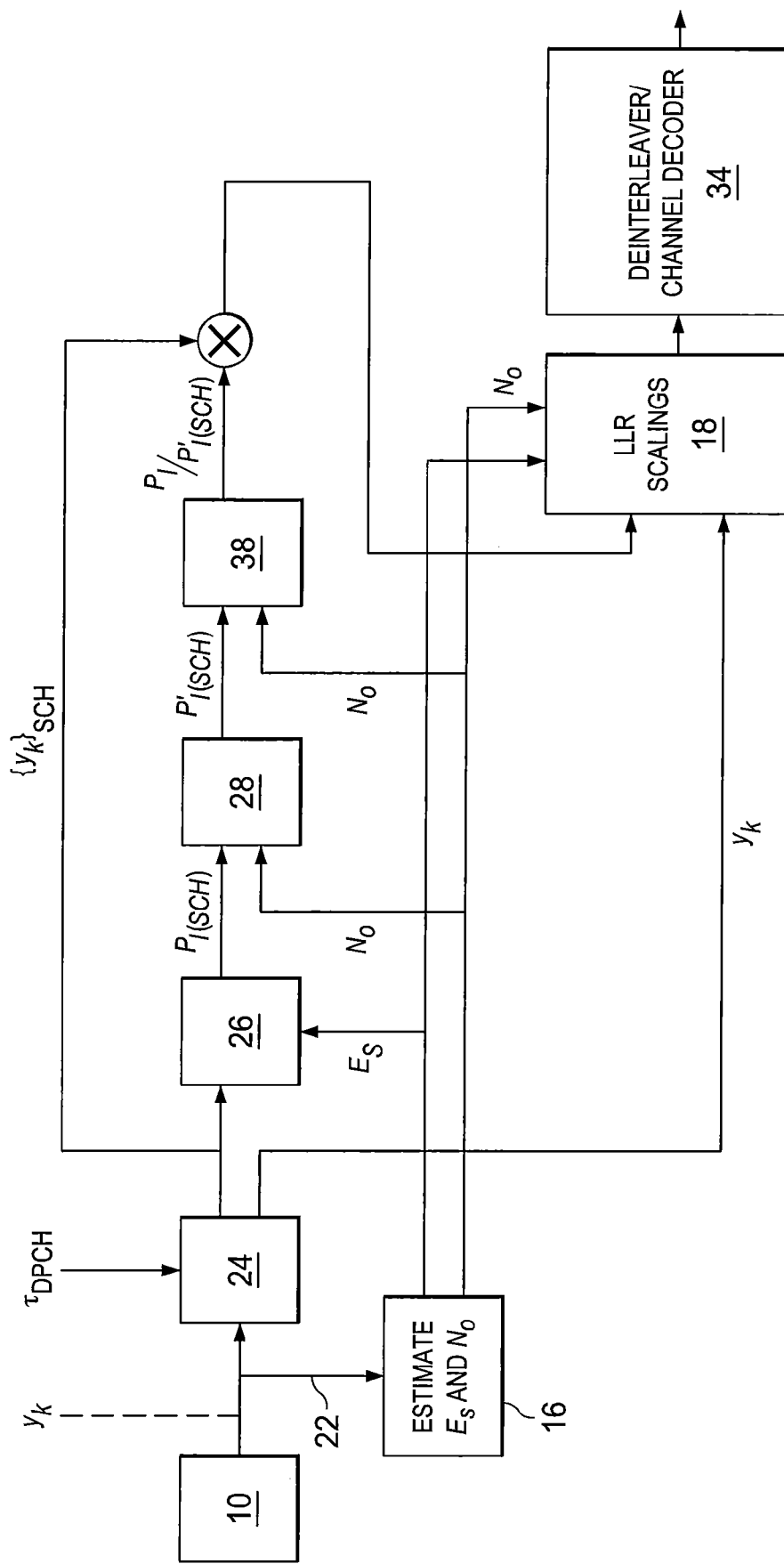
FIG. 5 is a schematic block diagram of a second embodiment of the invention.

FIG. 5 illustrates an alternative embodiment of the invention which avoids the need for two separate LLR scaling functions as in FIG. 3. In FIG. 5 like numerals denote like parts as in FIG. 3 and perform the same function. These parts will not be described further. A ratio determining block 38 determines a ratio of $P_I$ to $P'_{I(SCH)}$ and this ratio is supplied to a multiplier 40 which multiplies affected samples $\{y_k\}_{SCH}$ by the ratio. The multiplied samples are then supplied to an LLR scaling block 18 which can then operate similarly as in FIG. 2, by performing the LLR calculation using $N_0 = P_I$. The effect of the multiplication is that the outcome of the LLR calculation using $N_0 = P_I$ is equivalent to that produced by equation 7 and equation 8:

$$y'_{ik} = y_{ik} \times \frac{P_I}{P'_{I(SCH)}}, \quad \text{Equation 9}$$

$$L(b_{ik} \mid y_k) = y_{ik} \times \eta \frac{\sqrt{E_s}}{P_I}$$

Figure 6:
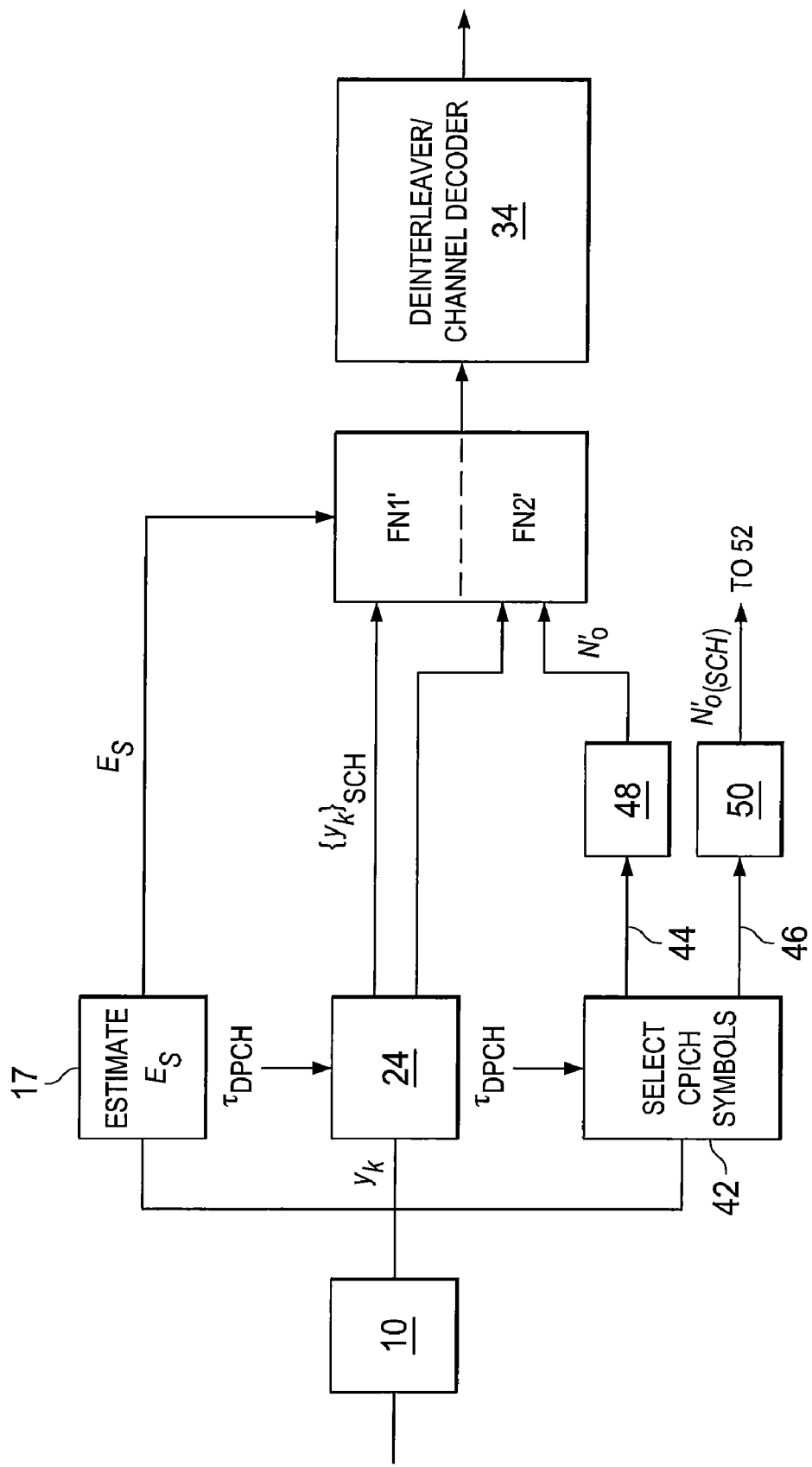
FIG. 6 is a schematic block diagram of a third embodiment of the invention.

FIG. 6 illustrates an alternative embodiment where the estimation of the noise-plus-interference power is based on the CPICH common pilot symbols. As shown in FIG. 6, a select CPICH symbol block 42 identifies which CPICH symbols are affected by the SCH signal 20 and divides the CPICH symbols into two subsets, a subset 44 which is affected and a subset 46 which is not affected. Each subset is supplied to a respective $N_0$ estimation block 48, 50 which derive estimates for the noise-plus-interference power $N_0$ for each set. These are denoted $N'_{0(SCH)}$ for the affected set and $N'_0$ for the non-affected set. The estimate of the noise-plus-interference power $N'_{0(SCH)}$ for the CPICH symbols affected by the SCH signal 20 is applied from the block 48 to an LLR scaling function FN2'. Similarly, the $N'_0$ values for the non-affected symbols are supplied to an LLR scaling function FN1' for the non-affected symbols. The average signal energy $E_s$ is determined from DPCH pilot samples $y_k$ as from FIGS. 3 and 5.

Figure 7:
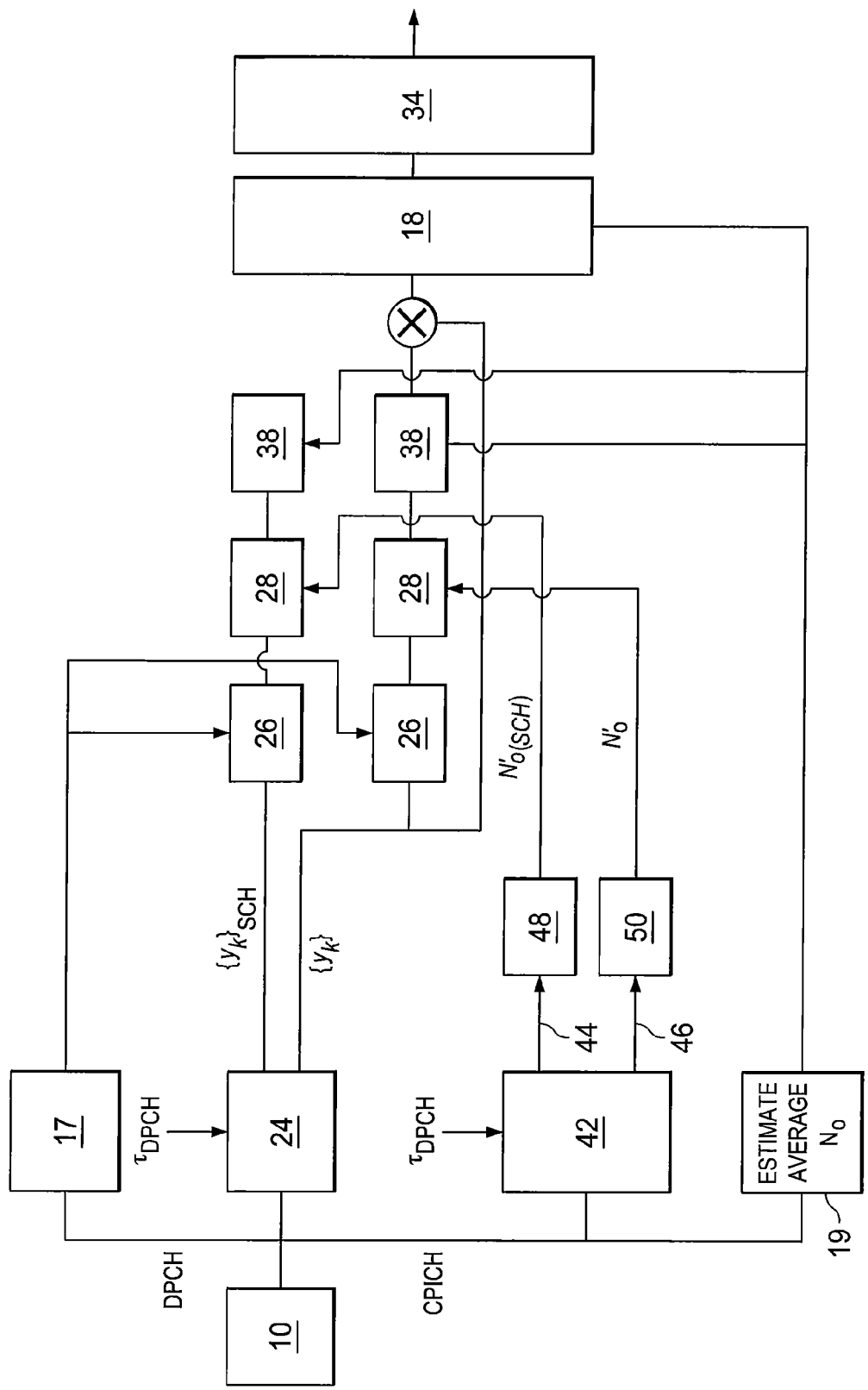
FIG. 7 is a schematic diagram illustrating a channel affected by interference from a plurality of synchronisation channels.

FIG. 7 illustrates a version of the embodiment of FIG. 6 but which requires only one LLR scaling function (as in FIG. 5). Like numerals denote like parts as in FIG. 6 and its operation will readily be appreciated from the description of FIGS. 5 and 6.

Note that in addition to duplicating the elements 26, 28, 38 it is necessary to estimate an average noise plus interference variance $N_0$—see block 19.

The usefulness of the above techniques can be intuitively understood in the following terms. In the case where the SCH interference is low compared with other sources of interference, then this procedure has no practical effect on the LLR values for those symbols which coincide with the SCH. However, where the SCH interference is large, using a value for the noise-plus-interference variance which takes this into account (e.g. $N_0 = P'_{I(SCH)}$ in FIG. 3) in the LLR calculation ensures that the bits corresponding to symbols affected by the SCH have smaller LLRs than their unaffected counterparts, which means in turn that they will carry less weight during the decoding process being correctly identified as less reliable.

A suboptimal, but lower complexity, implementation may be achieved by introducing erasures in the positions of the strongly affected symbols. This approach may be practically adequate for high levels of SCH interference, but the full algorithm allows for a precise calculation of the bit reliability for intermediate levels of SCH interference.

For a UE in soft handover or softer handover, i.e. in the case where the UE is receiving the same information in the downlink from multiple cells, (see 3GPP TS 25.922, "Technical Specification Group Radio Access Network; Radio Resource Management Strategies", December 2006), there is the possibility that the received DPDCH signal is affected by more than one downlink SCH transmission. FIG. 8 illustrates four sets of symbols affected in different ways by three SCH signals. FIGS. 8a through 8c illustrate three SCH channels with the SCH signals illustrated with respect to a time t=0 which denotes the beginning of a slot for the SCH channel 1.

FIG. 8d illustrates a DPCH slot showing two data fields Ndata1, Ndata2. The result is four sets of symbols affected in different ways by the three SCH signals.

That is, a first set of symbols in Ndata1 is affected only by SCH channel 1, a second set of symbols in Ndata1 is affected by SCH channel 1 and SCH channel 2, and a third set of symbols in Ndata2 are affected by SCH channel 3. Which symbols are affected in this case can be determined using the values of $\tau_{DPCH}$ for each cell. The algorithm may be adapted either by calculating a value for $P'_{I(SCH)}$ for each set of symbols affected by the same set of SCHs (see FIG. 3), or by only considering the SCH from the strongest cell (considering that it is unlikely that a UE will be sufficiently close to multiple cells for more than one SCH to interfere significantly).

Detailed computer simulations have been carried out to assess the effect of the proposed method for noise-plus-interference power estimates obtained from the DPCH dedicated pilots. The assessment has been based on a measure of the DPCH block error rate (BLER) under AWGN propagation conditions, and a single downlink cell with cell geometry of 35 dB (cell geometry being defined as the ratio between the total downlink power received from the wanted cell and the total power received from other cells plus thermal noise). The simulations refer to the transmission of two multiplexed DCH Transport Channels (TrCHs) in fixed positions, with the following parameters (3GPP TS 25.212, "Technical Specification Group Radio Access Network; Multiplexing and Channel Coding (FDD)", June 2005):

TrCH 1: channel coding=turbo code, transport block size=672 bits, transmission time interval=20 ms, rate matching attribute=135.

TrCH 2: channel coding=convolutional code, transport block size=148 bits, transmission time interval=40 ms, rate matching attribute=185.

The downlink DPCH has been transmitted using slot format 12 (3GPP TS 25.211, "Technical Specification Group Radio Access Network; Physical Channels and Mapping of Transport Channels onto Physical Channels (FDD)", June 2005, Section 5.3.2), with transmit power determined by the WCDMA power control algorithm (3GPP TS 25.214, "Technical Specification Group Radio Access Network; Physical Layer Procedures (FDD)", June 2005). The sum of the Primary SCH (P-SCH) and Secondary SCH (S-SCH) transmit power has been set 6 dB higher than the CPICH power. No Orthogonal Channel Noise Simulator (OCNS) has been included in the downlink signal (3GPP TS 25.101, "Technical Specification Group Radio Access Network; User Equipment (UE) Radio Transmission and Reception (FDD)", September 2005).

For $\tau_{DPCH}=0$ chips, the SCH position corresponds to the first 8 bits of every slot. The manner in which the channels TrCH1, TrCH2 map onto the data fields Ndata1, Ndata2 in a DPCH slot means that it affects only the turbo coded TrCH. With a conventional noise-plus-interference estimation, the turbo coded TrCH has experienced a BLER=15.6% and the convolutionally coded TrCH a BLER=0%. Using the proposed algorithm described with reference to FIG. 5 (SCH samples are pre-scaled by $P_I/P_{I(SCH)}$ before being processed into LLRs using $\sqrt{E_s/P_I}$), the turbo coded TrCH performance has been seen to dramatically improve to a BLER=0%, with no effect on the BLER performance of the convolutionally encoded TrCH.

For $\tau_{DPCH}=512$ chips, the SCH position corresponds to the last 8 DPDCH bits of every slot, and the mapping of the channels to the slot means it affects both the turbo coded TrCH and the convolutionally coded TrCH. Without the proposed algorithm the turbo coded TrCH has experienced a BLER=5.4% and the convolutionally coded TrCH a BLER=22.6%. Using the proposed algorithm, both the turbo coded and convolutionally coded BLERs have been seen to reduce to 0%.

While the invention has been described in the context of the above-referenced embodiments, it will be appreciated that alternatives are possible, and that the scope of this invention is limited only by the accompanying claims.

What is claimed is:

1. A method of processing a signal in a wireless digital communications system, wherein a source of non-stationary disturbance is present, said source having first statistics over a first time interval causing a first, less affected time portion of said signal received on a wireless channel, and second statistics over a second time interval, causing a second, most affected portion of said signal received on said wireless channel, the method comprising:
   identifying the second time portion of the received signal, most affected by the source of disturbance;
   generating a first estimate of the disturbance ($P_I$) for received samples in the first, less affected time portion of the received signal;
   generating a second estimate of the disturbance ($P_{I(SCH)}$) for received samples in the second time portion of the received signal; and
   generating reliability information for use in a decoding process, said reliability information indicating a level of reliability for transmitted data bits corresponding to the received signal samples, wherein the step of generating uses the first and second disturbance estimates whereby the bits corresponding to samples in the second most affected time portion have lower reliability estimates than samples in the first less affected time portion and thereby carry less weight during the decoding process.

2. A method according to claim 1, wherein the received signal has a signal energy, the method comprising the step of generating a signal estimate of an average of the signal energy from samples of the received signal and using said estimate to generate said reliability information.

3. A method according to claim 2, wherein the received signal comprises pilot symbols transmitted in a transmission time slot and the signal estimate is generated from the pilot symbols in the transmission time slot.

4. A method according to claim 3, wherein the first disturbance estimates are generated from pilot symbols in the transmission time slot.

5. A method according to claim 2, in which the transmitted data are in the form of modulation symbols in a transmission time slot.

6. A method according to claim 5, wherein the first disturbance estimates are generated from pilot symbols transmitted over a fixed portion of a transmission time slot and the second disturbance estimates are generated from data samples in the second time portion of the received signal.

7. A method according to claim 5, wherein pilot symbols are distributed over the transmission time slot, the first disturbance estimates are generated from samples of less affected pilot symbols in the first time portion and the second disturbance estimates are generated from samples of affected pilot symbols in the second time portion.

8. A method according to claim 5, wherein the transmitted modulation symbols carried by the received signal comprise data symbols.

9. A method according to claim 5, wherein the transmitted modulation symbols carried by the received signal comprise control symbols.

10. A method according to claim 5, wherein the source of disturbance comprises a synchronisation channel for synchronising other transmission channels.

11. A method according to claim 10, wherein the synchronisation channel is transmitted at high relative power with respect to other transmission channels.

12. A method according to claim 10, wherein the synchronisation channel is transmitted using a synchronization code which is not orthogonal to spreading codes used for transmission of data bits from at least one or more transport channel, multiplexed into a single physical channel and transmitted over a transmission time slot.

13. A method according to claim 1, wherein the step of using the first and second estimates to generate reliability information comprises using the first estimates to generate a first set of reliability information for decoding data bits corresponding to less affected samples in the first time portion, and using the second estimates to generate second reliability information for decoding data bits corresponding to samples in the second time portion.

14. A method according to claim 1, wherein the digital communications system is a wide band code-division multiple access system wherein data bits from at least one or more transport channels are multiplexed into a single physical channel, and transmitted over a transmission time slot using a specific spreading code.

15. A method according to claim 14, wherein spreading codes for the information from different sources are orthogonal.

16. A receiver for processing a signal in a wireless digital communications system, wherein a source of non-stationary disturbance is present, said source having first statistics over a first time interval causing a first, less affected time portion of said signal received on a wireless channel, and second statistics over a second a second time interval, causing a second, most affected portion of said signal received on said wireless channel, the receiver comprising:
   means for identifying the second time portion of the received signal most affected by the source of disturbance;

means for generating a first estimate of the disturbance ($P_I$) for received samples in the first, less affected time portion of the received signal;

means for generating a second estimate of the disturbance ($P_{I(SCH)}$) for received samples in the second time portion of the received signal; and means for generating reliability information for use in a decoding process, said reliability estimates indicating a level of reliability for transmitted data bits corresponding to the received signals, wherein the step of generating uses the first and second disturbance estimates whereby the bits corresponding to samples in the second most affected time portion have lower reliability estimates than samples in the first less affected time portion and thereby carry less weight during the decoding process.

17. A receiver according to claim 16, wherein the received signal has a signal energy, the receiver comprising means for generating signal estimates being estimates of an average of the signal energy from samples of the received signal, wherein said signal estimates are used to generate said reliability information.

18. A receiver according to claim 16, wherein the received signal comprises pilot symbols received in a received signal slot, and said means for generating first disturbance estimates comprises means for locating the pilot symbols at a fixed position of the received signal slot and for generating said first estimates from said pilot symbols.

19. A receiver according to claim 18, wherein the second time portion of the received signal has a received power, the receiver further comprises:

means for determining a total average of the received power of the second time portion of the received signal;

means for subtracting the signal estimate from the total average of the received power to determine a difference between the total average of the received power and the signal estimate; and means for determining the second disturbance estimate as a maximum of i) the difference between the total average received power on the affected time portion of the received signal and a signal estimate derived from the pilot symbols and ii) the first disturbance estimate.

20. A receiver according to claim 16, wherein said means for generating first disturbance estimates comprises locating from pilot symbols distributed over a transmission slot pilot symbols in the first time portion of the signal and the means for generating second disturbance estimates comprises means for locating pilot symbols in the second time portion of the received signal.

21. A receiver according to claim 16, comprising means for multiplying affected signal samples by a ratio of the first disturbance estimate to the second disturbance estimate to generate multiplied samples, wherein said means for using the first and second estimates to generate reliability information uses said multiplied samples to generate reliability information for decoding affected samples.

22. A mobile terminal incorporating a receiver for processing a signal in a wireless digital communications system, as defined in claim 16.

23. A receiver for processing a signal in a wireless digital communications system, wherein a source of non-stationary disturbance is present, said source having first statistics over a first time interval causing a first, less affected time portion of said signal received on a wireless channel, and second statistics over a second time interval, causing a second, most affected portion of said signal received on said wireless channel, the receiver comprising:

a component adapted to identify the second time portion of the received signal most affected by the source of disturbance;

a first estimator adapted to generate a first disturbance estimate for received samples in the first, less affected time portion of the received signal;

a second estimator adapted to generate a second disturbance estimate for received samples in the second affected time portion of the received signal; and a reliability information generator adapted to generate reliability information for use in a decoder, said reliability information indicating a level of reliability for transmitted data bits corresponding to the received signal samples, wherein the step of generating uses the first and second disturbance estimates whereby the bits corresponding to samples in the second most affected time portion have lower reliability estimates than samples in the first less affected portion and thereby carry less weight in the decoder.

24. A digital communications system wherein a source of non-stationary disturbance is present, said source having first statistics over a first time interval causing a first, less affected time portion of a signal received on a wireless channel, and second statistics over a second time interval, causing a second most affected portion of said signal received on said wireless channel, comprising:

an antenna for receiving a wireless signal;

a receiver front-end for receiving the wireless signal in analogue form and providing digital samples therefrom;

a baseband receiver for processing the signal samples, said baseband receiver comprising:

a first estimator adapted to generate a first disturbance estimate for received samples in said first time portion of the received signal;

a component adapted to identify said second time portion of said received signal, most affected by a source of disturbance;

a second estimator adapted to generate a second disturbance estimate for received samples in the second time portion of the received signal; and a reliability information generator adapted to generate reliability information for use in a decoder, said reliability information indicating a level of reliability for transmitted data bits corresponding to the received signal samples, wherein the step of generating uses the first and second disturbance estimates whereby the bits corresponding to samples in the second most affected time portion have lower reliability estimates than samples in the first less affected time portion and thereby carry less weight in the decoder.

25. A system according to claim 24, adapted to implement a wide band code-division multiple access system.

26. An integrated circuit incorporating a receiver for processing a signal in a wireless digital communications system, wherein a source of non-stationary disturbance is present, said source having first statistics over a first time interval causing a first, less affected time portion of said signal received on a wireless channel, and second statistics over a second time interval, causing a second most affected portion of said signal received on said wireless channel, the receiver comprising:

a component adapted to identify the second time portion of the received signal, most affected by the source of disturbance;

a first estimator adapted to generate a first disturbance estimate for received samples in the first, less affected time portion of the received signal;

a second estimator adapted to generate a second disturbance estimate for received samples in the second time portion of the received signal; and a reliability information generator adapted to generate reliability information for use in a decoder, said reliability information indicating a level of reliability for transmitted data bits corresponding to the received signal samples, wherein the step of generating uses the first and second disturbance estimates whereby the bits corresponding to samples in the second most affected time portion have lower reliability estimates than samples in the first less affected time portion and thereby carry less weight in the decoder.

27. A computer program product comprising computer code means which when installed in a computer implements the following steps in a method of processing a signal in a wireless digital communications system wherein a source of non-stationary disturbance is present, said source having first statistics over a first time interval causing a first, less affected time portion of said signal received on a wireless channel, and second statistics over a second time interval, causing a second, most affected time portion of said signal received on said wireless channel, the method steps comprising:

identifying, by a processor in said computer, said second time portion of the received signal most affected by the source of disturbance;

generating, by said processor in said computer, a first estimate of disturbance for received samples in said first, less affected time portion of the received signal;

generating, by said processor in said computer, a second estimate of the disturbance for received samples in the second time portion of the received signal; and using, by said processor in said computer, the first and second disturbance estimates to generate reliability information for data bits corresponding to the received signal samples, for use in a decoding process, wherein said generating uses the first and second estimates whereby the bits corresponding to samples in the second most affected time portion have lower reliability estimates than samples in the first less affected time portion and thereby carry less weight during the decoding process.

28. A method of processing a signal in a wireless digital communications system, wherein a source of non-stationary disturbance is present, said source having first statistics over a first time interval causing a first, less affected time portion of said signal received on a wireless channel, and second statistics over a second time interval, causing a second, most affected portion of said signal received on said wireless channel, and wherein said received signal has a signal energy and comprises pilot symbols transmitted in a transmission time slot, the method comprising:

generating a signal estimate from said pilot symbols in said transmission slot of an average of said signal energy;

identifying said second time portion of said received signal, most affected by said source of disturbance;

generating a first estimate of said disturbance ($P_I$) for received samples in said first, less affected time portion of said received signal;

generating a second estimate of said disturbance ($P_{I(SCH)}$) for received samples in said second time portion of said received signal, wherein said second time portion of said received signal has a received power;

determining a total average of said received power of said second time portion of said received signal;

subtracting said signal estimate from said total average of said received power to determine a difference between said total average of said received power and said signal estimate, wherein said second disturbance estimate is a maximum of i) said difference between said total average of said received power of said second time portion of said received signal and said signal estimate and ii) said first disturbance estimate; and using said estimate to generate reliability information for use in a decoding process, said reliability information indicating a level of reliability for transmitted data bits corresponding to said received signal samples, wherein said generating uses said first and second disturbance estimates whereby bits corresponding to samples in said second most affected time portion have lower reliability estimates than samples in said first less affected time portion and thereby carry less weight during said decoding process.

29. A method of processing a signal in a wireless digital communications system, wherein a source of non-stationary disturbance is present, said source having first statistics over a first time interval causing a first, less affected time portion of said signal received on a wireless channel, and second statistics over a second time interval, causing a second, most affected portion of said signal received on said wireless channel, and wherein said received signal has a signal energy and comprises pilot symbols transmitted in a transmission time slot, the method comprising:

generating a signal estimate from said pilot symbols in said transmission slot of an average of said signal energy;

identifying said second time portion of said received signal, most affected by said source of disturbance;

generating a first estimate of said disturbance ($P_I$) for received samples in said first, less affected time portion of said received signal;

generating a second estimate of said disturbance ($P_{I(SCH)}$) for received samples in said second time portion of said received signal, wherein said second time portion of said received signal has a received power;

determining a total average of said received power of said second time portion of said received signal;

subtracting said signal estimate from said total average of said received power to determine a difference between said total average of said received power and said signal estimate, wherein said second disturbance estimate is a maximum of i) said difference between said total average of said received power of said second time portion of said received signal and said signal estimate and ii) said first disturbance estimate; and using said estimate to generate reliability information for use in a decoding process, said reliability information indicating a level of reliability for transmitted data bits corresponding to said received signal samples, wherein said generating uses said first and second disturbance estimates whereby bits corresponding to samples in said second most affected time portion have lower reliability estimates than samples in said first less affected time portion and thereby carry less weight during said decoding process and wherein said generating using said first and second disturbance estimates comprises multiplying affected samples in said second time portion by a ration of said first disturbance estimate to said second disturbance estimate to generate multiplied samples and using said multiplied samples to generate said reliability information for decoding data bits corresponding to affected samples of said received signal.

* * * * *